United States Patent

[11] 3,550,861

| [72] | Inventor | William R. Teson<br>5908 Hazelbrook Ave., Lakewood, Calif. 90712 |
|---|---|---|
| [21] | Appl. No. | 755,888 |
| [22] | Filed | Aug. 28, 1968 |
| [45] | Patented | Dec. 29, 1970 |

[54] HOSE NOZZLE
1 Claim, 6 Drawing Figs.

| [52] | U.S. Cl. | 239/546, 239/602, 251/6 |
|---|---|---|
| [51] | Int. Cl. | B05b 17/00 |
| [50] | Field of Search | 239/455, 456, 457, 458, 519, 525, 546, 581, 602; 251/4, 6, 7, 8 |

[56] References Cited
UNITED STATES PATENTS

| 161,763 | 4/1875 | Curtis | 239/546 |
|---|---|---|---|
| 1,867,012 | 6/1932 | Jackson | 239/546X |
| 2,987,292 | 6/1961 | Teson et al. | 251/6 |

*Primary Examiner*—M. Henson Wood, Jr.
*Assistant Examiner*—Michael Y. Mar
*Attorney*—William C. Babcock ABSTRACT: A hose nozzle in which a dimensionally stable resilient tubular member is so disposed in a rigid tube that a plurality of circumferentially spaced balls may be moved radially to restrict the transverse interior cross section of the tubular member to such a degree as to control the rate of flow of fluid therethrough, as well as completely block the interior transverse cross section of the tubular member to prevent the flow of fluid longitudinally through the tubular member.

PATENTED DEC 29 1970 3,550,861

INVENTOR.
WILLIAM R. TESON
BY
William G. Babcock
ATTORNEY

HOSE NOZZLE

BACKGROUND OF THE INVENTION

1. Field of the Invention

A small, compact hose nozzle in which the flow of fluid therethrough is controlled by the radial deformation of a resilient tubular member forming a part thereof.

2. Description of the Prior Art

Heretofore, hose nozzles have been, in the main, fabricated from a number of metal parts so arranged that a valve member may be moved towards and away from a metal valve seat to control the flow of fluid through the nozzle. However, eventually such valve members become worn from constant use and must be replaced if the nozzle is to remain in a satisfactorily efficient condition. Repair of previously available nozzles is normally beyond the ability of the average user, and therefore many nozzles have been discarded when they start to leak.

The present invention overcomes the operational disadvantage of prior hose nozzles just described by providing one that is of simplified structure, requires little or no maintenance attention, and one in which the fluid control unit may be easily replaced by one having little or no mechanical skill without the use of special hand tools.

SUMMARY OF THE INVENTION

A hose nozzle in which a resilient flow control tubular member is removably mounted, and by use of radially movable, circumferentially spaced balls associated therewith may restrict the size of the fluid passage therein to a desired degree, or completely block the same when the nozzle is placed in a closed position.

A major object of the present invention is to provide a compact hose nozzle of simplified structure that removably supports a resilient tubular fluid flow controlling member in a protected position, and one in which the fluid flow control member may be easily and quickly replaced by one having little or no mechanical ability without the use of hand tools.

Another object of the invention is to supply a hose nozzle in which the flow of fluid through the resilient tubular member is controlled by the concurrent radial movement of a plurality of circumferentially spaced balls, with this movement of the balls being effected by an outwardly tapered cam surface that is longitudinally movable on the nozzle structure.

DESCRIPTION OF THE PREFERRED EMBODIMENT

Figure 1:
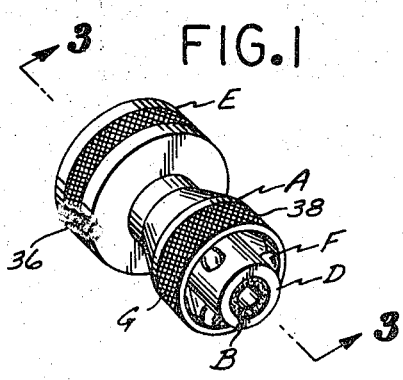
FIG. 1 is a perspective view of the nozzle in a first open position.
Figure 2:
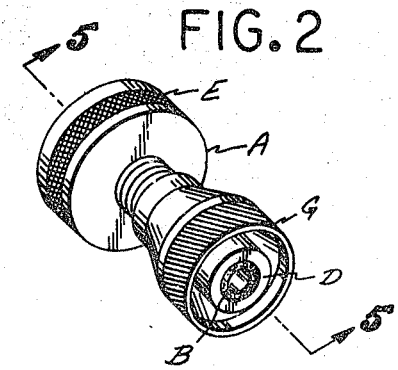
FIG. 2 is a perspective view of the nozzle in a second position in which the rate of flow of fluid through the nozzle is restricted.

The nozzle A, as shown in the drawing, includes a resilient tubular member B of sufficient wall thickness to be dimensionally stable. A flat circular flange C projects outwardly from a first end of member B.

The tubular member B is snugly, yet removably positioned within the confines of a rigid tube D that is preferably formed from a corrosion resistant metal. A cup-shaped member E is affixed to a first end of tube D to which the threaded end of a hose (not shown) may be threadedly secured.

At least three circumferentially spaced balls F are supported for radial movement on tube D and are at all times in contact with the exterior surface of tubular member B. A control member G is longitudinally movable on the exterior surface of tube D, and this control member includes a circular, outwardly tapering cam surface H. When control member G is moved towards a second end 10 of tube D, the cam surface H forces the balls F inwardly to deform a section of member B to reduce the transverse interior cross section of a passage 12 extending longitudinally therethrough to a desired degree.

The control member G may be moved towards the second end 10 to the extent that the passage 12 is completely blocked, with the nozzle then being in a closed position.

Figure 3:
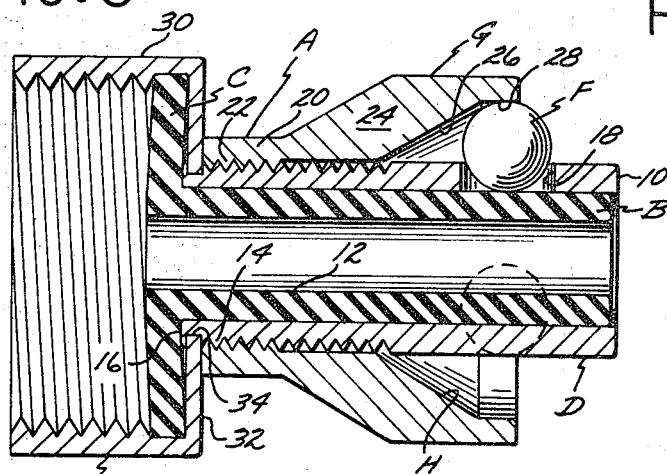
FIG. 3 is a longitudinal cross-sectional view of the nozzle, taken on the line 3-3 of FIG. 1.
Figure 4:
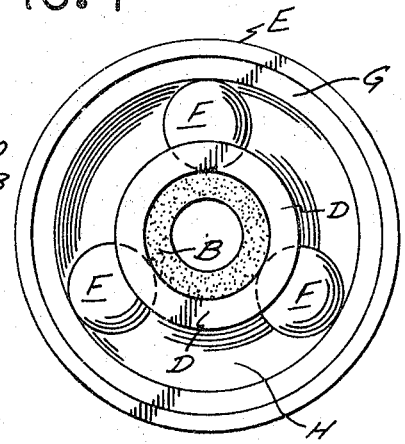
FIG. 4 is an end elevational view of the nozzle shown in FIG. 1.
Figure 5:
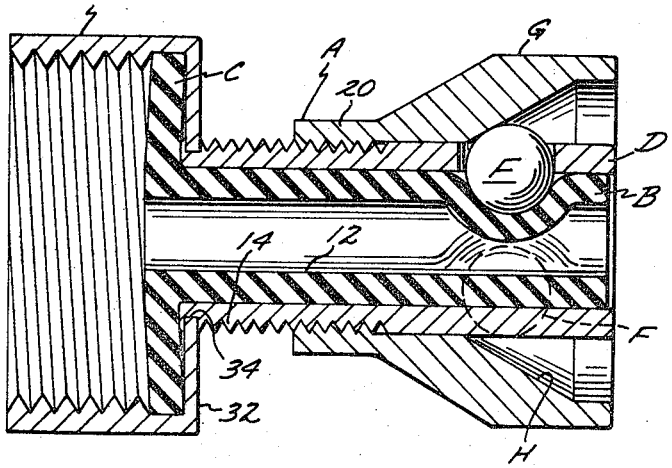
FIG. 5 is a longitudinal cross-sectional view of the nozzle, taken on the line 5-5 of FIG. 2.

The tube D, as shown in FIGS. 3 and 5, is provided with exterior threads adjacent a first end 16 thereof. At least three circumferentially spaced, transverse bores 18 are formed in tube D adjacent the second end 10 thereof. The radius of bores 18 is larger than that of the passage 12. Balls F are of such size as to be radially movable in the bores 18. Also, the radii of balls F are greater than the radius of passage 12.

Control member G includes a cylindrical portion 20 in which internal threads 20 are formed which engage threads 14. An extension 24 projects from portion 20 in the direction of second end 10 of tube D. Extension 24 defines an outwardly extending frustoconical cam surface 26, the outer edge of which develops into a cylindrical surface 28, and this surface contacts the balls F when the nozzle A is in the open position shown in FIG. 3.

Figure 6:
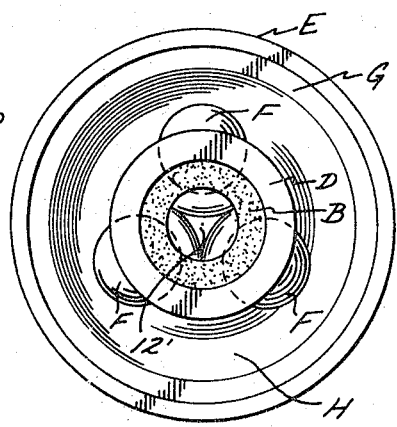
FIG. 6 is an end elevational view of the nozzle when in the position shown in FIG. 2.

When control member G is rotated in an appropriate direction on tube D, the control member moves longitudinally towards the balls F, with the cam surface 26 thereby forcing the balls inwardly. Inward movement of the balls F results in deformation of a section of the tubular member B, with the transverse cross section of the passage 12 being reduced to the area 12' shown in FIG. 6. This reduced transverse area 12' results in restriction in the rate of flow of fluid through the passage 12. Continued movement of the control member G towards the second end 10 of tube D causes deformation of tubular member B to the extent that the passage 12 thereof is completely blocked, and the nozzle A is in a closed position.

The hose connection E is cup-shaped and defined by a cylindrical shell 30 provided with an annulus-shaped endpiece 32 that rotatably engages a circumferentially extending slot 34 in tube E adjacent the first end 16 thereof, as shown in FIG. 3. Flange C is disposed adjacent to endpiece 32, and serves as a seal when the threaded end (not shown) of a hose engages the cup-shaped connection E. It will be seen in FIG. 3 that the tubular member B and flange C may be easily removed from the nozzle A when the occasion so requires, and without the use of hand tools. Likewise, a new tubular member B and flange C may be easily mounted in the nozzle A. Hose connection E and control member G preferably are provided with knurled gripping surfaces 36 and 38 thereon, as shown in FIG. 1, for ease in handling the hose nozzle A when it is wet.

The nozzle A is used in the same manner as a conventional hose nozzle, and no description as to its use is required beyond that previously given.

I claim:

1. A hose nozzled comprising:
    a. a resilient tubular member of such wall thickness as to be dimensionally stable, which member has first and second ends;
    b. a rigid tube in which said tubular member is snugly disposed, with external threads being formed on said tube adjacent said first end thereof and with at least three circumferentially spaced transverse bores being formed in said tube adjacent said second end thereof, each of which bores has a radius greater than that of an internal bore in said tube;
    c. a plurality of balls disposed in said bores in contact with said member, which balls are radially movable relative to said tube, with each of said balls being of greater radius than that of said internal bore;
    d. an internally threaded cup-shaped member mounted on a first end of said tube for connecting an externally threaded end of a hose thereto, said cup-shaped member defining a flat annulus shaped surface on the interior thereof;

e. an internally threaded control member mounted on said threads of said tube, which control member includes a circular cam surface that slopes outwardly towards said second end of said tube, with said control member when rotated in an appropriate direction moving from a first position towards said second end to permit said cam surface to force said balls inwardly to deform a section of said tubular member and reduce the cross section of said passage to s desired degree, which control member when moved to a second position forces said balls inwardly to the extent that said tubular member is deformed to the extent that said passage is completely blocked and fluid cannot discharge from said tubular member; and f. a flat resilient flange that projects outwardly from said first end of said tubular member and abuts against said annulus shaped surface to act as a seal when said externally threaded end of said hose engages said cup-shaped member.